US012561407B2

(12) United States Patent     (10) Patent No.:   US 12,561,407 B2

Ahuja et al.             (45) Date of Patent:     Feb. 24, 2026

(54) ONE-PASS APPROACH TO AUTOMATED TIMESERIES FORECASTING

(71) Applicant: Oracle International Corporation, Redwood Shores, CA (US)

(72) Inventors: Ritesh Ahuja, Los Angeles, CA (US); Anatoly Yakovlev, Hayward, CA (US); Venkatanathan Varadarajan, Seattle, WA (US); Sandeep R. Agrawal, San Jose, CA (US); Hesam Fathi Moghadam, Sunnyvale, CA (US); Sanjay Jinturkar, Santa Clara, CA (US); Nipun Agarwal, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1032 days.

(21) Appl. No.: 17/528,305

(22) Filed: Nov. 17, 2021

(65) Prior Publication Data

US 2023/0153394 A1     May 18, 2023

(51) Int. Cl.
     *G06N 20/00*        (2019.01)
     *G06F 18/10*        (2023.01)
             (Continued)

(52) U.S. Cl.
     CPC ............ *G06F 18/285* (2023.01); *G06F 18/10* (2023.01); *G06F 18/2148* (2023.01); *G06F 18/2193* (2023.01); *G06N 20/00* (2019.01)

(58) Field of Classification Search
     CPC .... G06F 18/285; G06F 18/10; G06F 18/2148; G06F 18/2193; G06F 2218/02;
                   (Continued)

(56) References Cited

U.S. PATENT DOCUMENTS

| | | | |
|---|---|---|---|
| 11,281,969 B1 * | 3/2022 | Rangapuram | G06N 7/01 |
| 11,443,237 B1 * | 9/2022 | Song | G06F 16/338 |

(Continued)

OTHER PUBLICATIONS

Bermadez-Chacan et al. Automatic problem-specific hyperparameter optimization and model selection for supervised machine learning: Technical Report [retrieved on Jun. 16, 2025]. Retrieved from the Internet:<URL: https://doi.org/10.3929/ethz-a-010558061> (Year: 2015).*

(Continued)

*Primary Examiner* — Michael J Huntley
*Assistant Examiner* — Alfredo Campos
(74) *Attorney, Agent, or Firm* — Hickman Becker Bingham Ledesma LLP

(57) ABSTRACT

Herein are timeseries preprocessing, model selection, and hyperparameter tuning techniques for forecasting development based on temporal statistics of a timeseries and a single feed-forward pass through a machine learning (ML) pipeline. In an embodiment, a computer hosts and operates the ML pipeline that automatically measures temporal statistic (s) of a timeseries. ML algorithm selection, cross validation, and hyperparameters tuning is based on the temporal statistics of the timeseries. The result from the ML pipeline is a rigorously trained and production ready ML model that is validated to have increased accuracy for multiple prediction horizons. Based on the temporal statistics, efficiency is achieved by asymmetry of investment of computer resources in the tuning and training of the most promising ML algorithm(s). Compared to other approaches, this ML pipeline produces a more accurate ML model for a given amount of computer resources and consumes fewer computer resources to achieve a given accuracy.

16 Claims, 6 Drawing Sheets

(51) Int. Cl.
G06F 18/20 (2023.01)
G06F 18/21 (2023.01)
G06F 18/214 (2023.01)

(58) Field of Classification Search
CPC ......... G06F 18/26; G06F 18/27; G06N 20/00;
G06N 3/0455; G06N 3/088; G06N 3/09;
G06N 20/20
See application file for complete search history.

(56) References Cited

U.S. PATENT DOCUMENTS

| | | | |
|---|---|---|---|
| 11,561,946 B1 * | 1/2023 | Jiang | G06N 7/01 |
| 2002/0169735 A1 | 11/2002 | Kil et al. | |
| 2014/0379904 A1 | 12/2014 | Shimasaki | |
| 2018/0022539 A1 | 1/2018 | Vedani | |
| 2018/0046926 A1 | 2/2018 | Achin | |
| 2018/0225391 A1 | 8/2018 | Sali et al. | |
| 2018/0246941 A1 | 8/2018 | Salunke et al. | |
| 2019/0392255 A1 | 12/2019 | Franklin | |
| 2020/0082013 A1 | 3/2020 | Triplet et al. | |
| 2020/0183946 A1 | 6/2020 | Pelloin | |
| 2020/0184382 A1 * | 6/2020 | Fishkov | G06N 20/20 |
| 2021/0089927 A9 | 3/2021 | Ryan | |
| 2021/0216907 A1 * | 7/2021 | Husain | G06N 20/00 |
| 2021/0342691 A1 * | 11/2021 | Lui | G06F 18/24133 |
| 2021/0390466 A1 | 12/2021 | Varadarajan et al. | |
| 2022/0121955 A1 | 4/2022 | Chavoshi et al. | |

OTHER PUBLICATIONS

Suradhaniwar, S., Kar, S., Durbha, S. S., & Jagarlapudi, A. (2021). Time Series Forecasting of Univariate Agrometeorological Data: A Comparative Performance Evaluation via One-Step and Multi-Step Ahead Forecasting Strategies. Sensors, 21(7), 2430 (Year: 2021).*
Fawaz et al. "Deep learning for time series classification: a review", Data Mining and Knowledge Discovery pp. 917-963 (2019).
Busseti et al., "Deep learning for time series modeling", Technical Report, Stanford University pp. 1-5 (2012).
Bingham er al., "Pyro: Deep Universal Probabilistic Programming", Journal of Machine Learning Research 20 (2019) 1-6, http://jmlr.org/papers/v20/18-403.html, dated Feb. 2019, 6 pages.
Jiang et al., "Markov Cross-Validation for Time Series Model Evaluations", Elsevier, Information Sciences (2016), doi: 10.1016/j.ins.2016.09.061, dated 2017, 29 pages.
Hyndman, "Automatic Time Series Forecasting: The Forecast Package for R", Journal of Statistical Software, vol. 27, Issue 3, http://www.jstatsoft.org/, dated Jul. 2008, 22 pages.
Gal et al., "Dropout as a Bayesian Approximation Representing Model Uncertainty in Deep Learning", Proceedings of the 33rd International Conference on Machine Learning, JMLR: W&CP vol. 48, dated 2016, 10 pages.
Fildes et al., "An Evaluation of Simple Forecasting Model Selection Rules", Lancaster University Management School, http://www.lums.lancs.ac.uk/publications, dated 2013, 32 pages.
Faloutsos et al., "Fast Subsequence Matching in Time Series Databases", dated 1998, 11 pages.
De Livera, "Automatic Forecasting with a Modified Exponential Smoothing State space Framework", Department of Econometrics and Business Statistics, http://www.buseco.monash.edu.au/depts/ebs/pubs/wpapers/, dated 2010, 30 pages.
"Machine Learning Approaches for Time Series Data" dated May 19, 2019, 25 pages.
Brownlee, Jason, "Time Series Forecasting as Supervised Learning", dated Aug. 21, 2019, 2 pages.
Lim et al., "Deep Probabilistic Modelling of Price Movements for High-Frequency Trading", https://arxiv.org/pdf/2004.01498.pdf, dated 2020, 8 pages.
Bergmeir et al., "A Note on the Validity of Cross-Validation for Evaluating Time Series Prediction", Department of Econometrics and Business Statistics, http://www.buseco.monash.edu.au/depts/ebs/pubs/wpapers/, dated 2018, 17 pages.
Artificial Intelligence Blog, "Announcing Automated ML Capability in Azure Machine Learning", dated Sep. 24, 2018, 8 pages.
Amazon SageMaker, "DeepAR Forecasting Algorithm", https://docs.aws.amazon.com/sagemaker/latest/dg/deepar.html,last viewed on Jun. 29, 2020, 5 pages.
Alexandrov et al., "GluonTS: Probabilistic and Neural Time Series Modeling in Python", Journal of Machine Learning Research 21 (2020) 1-6, http://jmlr.org/papers/v21/19-820.html, dated Apr. 20, 2020, 6 pages.
Ahmed et al., "An Empirical Comparison of Machine Learning Models for Time Series Forecasting", dated Sep. 15, 2010, 31 pages.
Abe et al., "Developing an Integrated Time-Series Data Mining Environment for Medical Data Mining", Seventh IEEE International Conference on Data Mining—Workshops, dated 2007, 6 pages.
Camerra et al., "Beyond One Billion Time Series: Indexing and Mining Very Large Time Series Collections with iSAX2+", dated Feb. 16, 2013, 29 pages.
Oreshkin et al., "N-Beats: Neural Basis Expansion Analysis for Interpretable Time Series Forecasting", published as a conference paper at ICLR 2020, arXiv:1905.10437v4 [cs.LG] Feb. 20, 2020, 31 pages.
Wang et al., "Experimental Comparison of Representation Methods and Distance Measures for Time Series Data", dated Feb. 12, 2010, 35 pages.
Taylor et al., "Forecasting at Scale", PeerJ Preprints, https://doi.org/10.7287/peerj.preprints.3190v2, dated Sep. 27, 2017, 25 pages.
Song et al., "Deep r-th Root of Rank Supervised Joint Binary Embedding for Multivariate Time Series Retrieval", KDD 2018, dated Aug. 19-23, 2018, London, United Kingdom, 10 pages.
Shah et al., "AutoAI-TS: AutoAI for Time Series Forecasting", Conference'17, Jul. 2017, Washington, DC, https://dl.acm.org/doi/abs/10.1145/3448016.3457557, dated Mar. 8, 2021, 13 pages.
Schoenfeld et al., "Preprocessor Selection for Machine Learning Pipelines", dated 2018, 7 pages.
Salinas et al., "DeepAR: Probabilistic Forecasting with Autoregressive Recurrent Networks", Elsevier, https://doi.org/10.1016/j.ijforecast.2019.07.001, dated 2020, 11 pages.
Jung et al., "A Worrying Analysis of Probabilistic Time-Series Models for Sales Forecasting", 1st I Can't Believe It's Not Better Workshop, http://proceedings.mlr.press/v137/jung20a/jung20a.pdf, dated 2020, 8 pages.
Paoli et al., "Forecasting of Preprocessed Daily Solar Radiation Time Series Using Neural Networks", Solar Energy, Elsevier, dated 2010, 44 pages.
Kraska, Tim, "Northstar: An Interactive Data Science System", Proceedings of the VLDB Endowment, vol. 11, No. 12 Copyright 2018 VLDB Endowment, 15 pages.
Oracle, "The Oracle AutoML Pipeline" Four Main Stages, https://docs.cloud.oracle.com/en-us/iaas/tools/ads-sdk/latest/user_guide/automl/overview.html, dated Apr. 28, 2020 or later, 4 pages.
Olson et al., "Evaluation of a Tree-based Pipeline Optimization Tool for Automating Data Science", dated Mar. 20, 2016, 8 pages.
Ng, "Data Preprocessing for Machine Learning: Options and Recommendations", dated Jun. 22, 2020, 12 pages.
Ng et al., "Orbit: Probabilistic Forecast with Exponential Smoothing", arXiv:2004.08492v4 [stat.CO], dated 2020, 6 pages.
Loning et al., "SKTIME: A Unified Interface for Machine Learning with Time Series", https://github.com/alan-turing-institute/sktime, dated 2019, 9 pages.
Lin et al., "Experiencing SAX: A Novel Symbolic Representation of Time Series", dated Apr. 3, 2007, 38 pages.
Yakovlev et al., "Oracle AutoML: A Fast and Predictive AutoML Pipeline", Proceedings of the VLDB Endowment, vol. 13, No. 12, DOI: https://doi.org/10.14778/3415478.3415542, dated 2020, 15 pages.
Ploetz et al., "Feature Learning for Activity Recognition in Ubiquitous Computing", dated Jan. 2011, 7 pages.
Kotthoff et al., "Auto-WEKA: Automatic Model Selection and Hyperparmeter Optimization in WEKA", Ch. 4, Automated Machine

(56) References Cited

OTHER PUBLICATIONS

Learning Methods, Sys, Challenges, https://doi.org/10.1007/978-3-030-05318-5_4, pp. 81-95, May 18, 2019, 15pgs.

Komer et al., "Hyperopt-Sklearn", Automated Machine Learning Methods, Systems, Challenges, https://doi.org/10.1007/978-3-030-05318-5_5, pp. 97-111, May 18, 2019, 15pgs.

Cuesta, Aitor Palacios, "Hyperparameter Optimization for Large-scale Machine Learning", Master Thesis, Tech Univ of Berlin, DOI: 10.13140/RG.2.2.33876.65927, Oct. 2018, 85pgs.

Maher et al., "SmartML: A Meta Learning-Based Framework for Automated Selection and Hyperparameter Tuning for Machine Learning Algorithms", Proceedings of the 22nd International Conference on Extending Database Technology (EDBT), (Mar. 2019).

Berrar, D., "Cross-Validation" Research Gate at: https://www.researchgate.net/publication/324701535 (Jan. 2018) 9 pages.

Wei et al., "Learning and Using the Arrow of Time", Proceedings of the IEEE Conference on Computer Vision and Pattern Recognition, https://openaccess.thecvf.com/content_cvpr_2018/papers/Wei_Learning_and_Using_CVPR_2018_paper.pdf, dated 2018, 9 pages.

Misra et al., "Shuffle and Learn: Unsupervised Learning using Temporal Order Verification", European Conference on Computer Vision, https://arxiv.org/pdf/1603.08561.pdf, dated Jul. 2016, 21 pages.

\* cited by examiner

FIG. 2

201 Automatically measure temporal statistic(s) of original timeseries

202 Based on temporal statistic(s) of timeseries, measure joint distribution

203 Based on unit root, calculate count of differencing operations needed for data stationarity 205 Based on temporal statistic(s) of timeseries, automatically select length of subsequence of adjusted timeseries for training 206 Based on temporal statistic(s) of timeseries, validate proxy models 207 Based on temporal statistic(s) of timeseries, select most accurate machine learning (ML) algorithm 208 Based on most accurate ML algorithm, instantiate best ML model 209 Based on temporal statistic(s) of timeseries, identify values subrange of hyperparameter 210A Based on temporal statistic(s) of timeseries, tune hyperparameters of best ML model 210B Based on temporal statistic(s) of timeseries, validate best ML model

FIG. 3

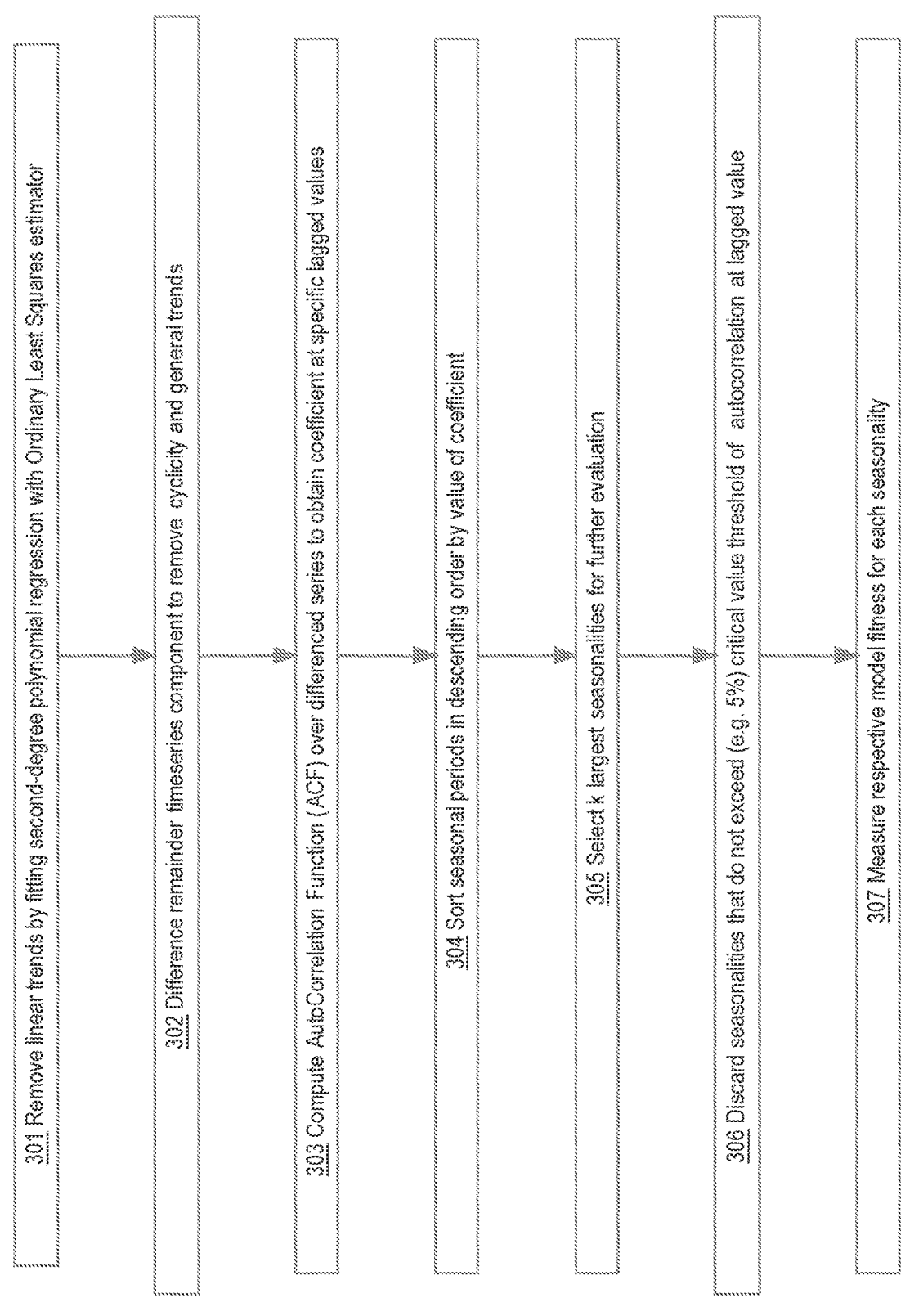

301 Remove linear trends by fitting second-degree polynomial regression with Ordinary Least Squares estimator 302 Difference remainder timeseries component to remove cyclicity and general trends 303 Compute AutoCorrelation Function (ACF) over differenced series to obtain coefficient at specific lagged values 304 Sort seasonal periods in descending order by value of coefficient 305 Select k largest seasonalities for further evaluation 306 Discard seasonalities that do not exceed (e.g. 5%) critical value threshold of autocorrelation at lagged value 307 Measure respective model fitness for each seasonality 401 Set minimum training set length based on seasonality (e.g. minimum 2 seasons)

402 Set validation length based on frequency

403 Calculate count of cross validation folds based on any of:
- full timeseries length,
- frequency, and/or
- seasonality 404 Based on frequency and/or seasonality, calculate forecast horizon duration

ONE-PASS APPROACH TO AUTOMATED TIMESERIES FORECASTING

FIELD OF THE INVENTION

The present invention relates to machine learning pipelines for timeseries. Herein are timeseries preprocessing, model selection, and hyperparameter tuning techniques based on temporal statistics of a timeseries and a single feed-forward pass through a machine learning pipeline.

BACKGROUND

A timeseries is a series or sequence of (e.g. multi-field) data points ordered by time. Timeseries forecasting is the process of predicting future values in the timeseries. Machine learning based forecasting has become popular in both private and public decision-making processes, business and workload forecasting, and many other use cases. Reusable forecasting software faces a challenge of forecasting many dissimilar or somewhat similar timeseries, wherein automatic approaches to selecting an appropriate method are generally unavailable in the state of the art.

Use of probabilistic timeseries models to automate optimal decision making under uncertainty for large data volumes is a well explored topic, and at present, one of intense research interest. State of the art algorithms can best fit a particular data domain but do not work effectively for datasets that are outside of the scope for which the algorithms were tuned. Even within a data domain, performance varies since each algorithm is best suited to a varying degree of strength of basic timeseries characteristics such as stationarity, predictability, trend, and seasonality that are explained later herein.

Without a forecasting statistician to recommend algorithms worth applying for a desired data domain, model selection and tuning are tedious, error prone, and inefficient. Previous efforts on automating forecasting have been limited to determining a best hyperparameters configuration for an individual class of algorithm that has been predetermined by an expert user to be the best fit for the concerned data domain. Model selection and tuning for timeseries prediction are hindered by an overwhelming variety of ML algorithms. In the open-source community, all packages are in early stages of development. Universally, open-source packages and commercial products lack documentation and lack an evaluation of qualitative performance and running time efficiency for ready comparison.

A lack of thorough analysis hinders choosing which model is worth applying for a desired timeseries. A straightforward approach to automate model building process is to exhaustively evaluate and compare all available algorithm and hyperparameters values combinations. While that approach is offered by several open-source packages, it results in an exorbitant runtime cost.

As a particular example, it is difficult to discover an optimal forecasting time horizon (i.e. how far into the future should a prediction be) before developing a model. Machine learning algorithms differ in accuracy at forecasting at various lengths of future forecast periods, and existing solutions rely on having this information declared in advance of model development. For instance, approaches such as AWS Forecast or Azure Timeseries Insights bypass this issue by forcing a machine learning pipeline user to specify an intended forecast period as input for a pipeline invocation. This may degrade real-world solutions because tuned model performance can suffer if the model is used for forecast periods shorter or longer than as specified at the start.

BRIEF DESCRIPTION OF THE DRAWINGS

In the drawings:

FIG. 2 is a flow diagram that depicts an example computer process that applies timeseries preprocessing, model selection, and hyperparameter tuning techniques based on temporal statistics of an original timeseries and a single feed-forward pass through an ML pipeline;

FIG. 3 is a flow diagram that depicts an example computer process to analyze seasonalities in an ML pipeline;

DETAILED DESCRIPTION

Figure 1:
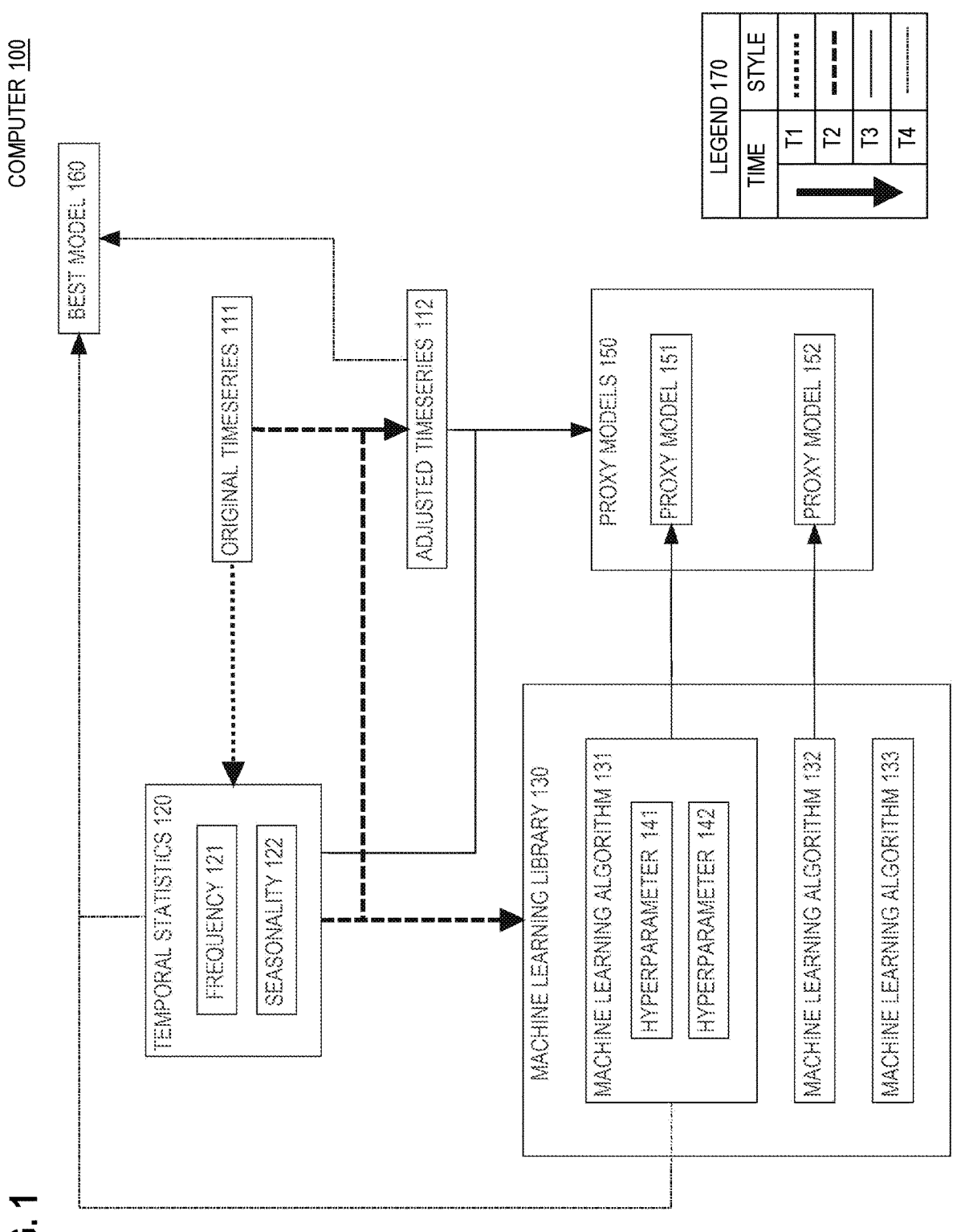
FIG. 1 is a block diagram that depicts an example computer that applies timeseries preprocessing, model selection, and hyperparameter tuning techniques based on temporal statistics of an original timeseries and a single feed-forward pass through a machine learning (ML) pipeline.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

GENERAL OVERVIEW

Herein are timeseries preprocessing, model selection, and hyperparameter tuning techniques for forecasting model development based on temporal statistics of a timeseries and a single feed-forward pass through a machine learning (ML) pipeline. A novel one-pass ML pipeline is powered by: a) an advanced timeseries preprocessor that informs downstream tasks based on a user dataset at runtime, b) proxy ML models that adapt to the dataset to facilitate accurate algorithm selection, and c) a hyperparameters tuning stage that defines value subranges for an ML algorithm according to the preprocessor's recommendation. A scoring strategy for model evaluation that adapts to seasonality periods and timeseries length ensures that the various ML algorithms are fairly compared. This provides efficient development of highly accurate forecasting models.

The ML pipeline herein addresses the challenge of automating algorithm selection and tuning with special focus on a one-pass feed-forward approach to optimizing runtime efficiency while providing high forecasting accuracy. In a preprocessing first phase, the ML pipeline accepts as input a timeseries comprised of time-ordered data points. Data preprocessing steps ensure input has a well-defined and consistent frequency and has a value at every sample point in a continuous time span, imputing values to fill gaps where necessary. The training and validation data are together passed into the ML pipeline. A custom timeseries-specific cross validation strategy maximizes exploratory power of the ML pipeline. A novel adaptation of Walk-Forward Cross validation (WFCV) is used. Based on the length and sample frequency of a timeseries, the ML pipeline automatically chooses a count of cross validation folds and the length of a validation set. The choice of these parameters ensures accurate forecasts over multiple lead times, irrespective of the length of the future forecast horizon selected by the user.

In the next phase, the ML pipeline selects the most appropriate one or few forecasting algorithm(s) for the input timeseries. A set of many forecasting algorithms are available internally for the ML pipeline to choose from because there is no one-size-fits-all solution, especially as it applies to forecasting timeseries data. Each ML algorithm is best suited to a varying degree of strength of basic timeseries characteristics such as stationarity, predictability, trend and seasonality that are explained later herein. The algorithm selection step evaluates each forecasting algorithm quickly for its approximate goodness of fit, using at least some of a predefined set of default model hyperparameters for each algorithm.

This approach may operate without knowledge of forecast horizons desired by the forecaster model. Validation lengths during cross validation have significant influence over hyperparameter tuning for an ML model and the quality of the ML model's forecasts. An embodiment creates cross validation sets, which are robust to multiple forecast periods, by customizing the validation periods and folds based on the seasonality and timeseries length of each input dataset. This cross validation strategy facilitates more reliable selection of the top choice of model during algorithm selection. Cross validation customizations herein have not been explored in the literature.

Herein is a one-pass forecasting pipeline that can automatically preprocess a timeseries and select the best algorithm and tune its hyperparameters for the timeseries, regardless of the frequency of samples in the timeseries, its seasonality, its stationarity, or length. The ML pipeline consists of: an advanced timeseries preprocessor, an ML algorithm selection stage that utilizes proxy models that are informed by the preprocessor, and a hyperparameters tuning stage whose tuning range is informed by the preprocessor for any available ML algorithm.

As explained herein, the advanced timeseries preprocessor estimates data seasonality, heteroskedasticity, a required degree of differencing to achieve data stationarity, and the frequency of samples in the timeseries such as based on timestamps. These estimated statistical values are used to:

Inform algorithm selection for configuration of proxy models to better represent their tuned model counterparts. This quickly results in a snapshot estimation of the best algorithm for a given timeseries dataset. Based on estimated statistical properties of the timeseries, ML algorithms that are not well-suited for the class of dataset can be disabled, further accelerating the ML pipeline. Another benefit is improved quality of forecasts due to preventing ML models from overfitting.

Inform the hyperparameters tuning stage to reduce tuning range(s) for seasonal periodicity and differencing order of the ML algorithms. This results in significant acceleration by reducing a count of trials and, importantly and counterintuitively, improves generalization of tuned models.

Inform a novel and adaptive cross validation strategy to achieve a highest accuracy for a given dataset.

As explained herein, the adaptive cross validation strategy extends Walk Forward Cross Validation (WFCV) to select an appropriate validation forecast horizon length, minimum required training set length, and a count of folds based on estimated timeseries frequency and seasonal periodicity. A predefined forecast horizon is not required in this approach, unlike in typical industry solutions. By informing the specifics (such as the validation length) of the cross validation strategy at runtime, we can ensure that potentially well performing candidates are not unfairly overlooked due to unrepresentatively poor accuracy due to unsuitable proxy model configuration for the timeseries.

Appropriately selected cross validation strategy and fitness scoring metric enables different forecasting methods with various hyperparameter configurations to be compared directly (i.e. apples-to-apples comparison). Other approaches rely on each individual ML algorithm's built-in quality-of-fit metric that is not directly comparable to other algorithms' fitness metrics. This facilitates the ML pipeline reliably selecting the best ML algorithm and hyperparameters configuration for a given timeseries.

The ML pipeline for forecasting provides a one-pass approach to predicting relative algorithm performance throughout the ML pipeline for various ML algorithms, configurations of ML algorithms, and subsets of a timeseries. This accelerates compared to sequential and iterative approaches which can be time consuming.

The algorithm selection step quickly evaluates each ML algorithm for its approximate goodness-of-fit, using a predefined set of hyperparameters. ML model instances with these predefined hyperparameters are referred to herein as proxy models. Proxy models need to be good predictors of the fitness of an exhaustively tuned forecasting algorithm, otherwise a wrong decision for model selection could severely decrease the accuracy of the ML pipeline in downstream stages.

Without requiring hyperparameter tuning, this approach accurately predicts a relative ranking of different ML algorithms. In the case of forecasting, ML model performance is highly dependent on crucial timeseries characteristics such as seasonality period and distance to stationarity. Without evaluating these characteristics, proxy models cannot accurately reflect the tuned score of the algorithms on the dataset. The timeseries preprocessing stage of the ML pipeline: a) performs statistical tests on the timeseries to determine these characteristics, b) sets seasonality and degree of differencing hyperparameters for the proxy models, and c) informs the subrange of values for the hyperparameters during the tuning stage. This enables a one-pass (non-iterative) and efficient forecasting ML pipeline and prevents overfitting of the ML algorithms by avoiding infeasible hyperparameter values.

The ML pipeline automatically determines seasonality periods for a timeseries. The timeseries preprocessor automatically discovers the presence and strength of seasonal effects in the data, while considering any heteroscedasticity (i.e., the effect of independent variable change on the variability of a dependent variable) as explained herein. Seasonal periodicity in the data can differ from the sample frequency. For example, data collected daily can see seasonal effects every seven days (corresponding to a weekly periodicity), every 30.5 days (monthly periodicity), or every 365 days (yearly periodicity). After determining the dominant seasonality period, the proxy models of various ML algorithms can be fairly compared.

The application of ML is becoming ubiquitous, but the data science expertise remains and will remain scarce. To support such needs, relying on data scientists may not be sustainable or scalable for big corporations and their enterprise customers. Given a timeseries, the managed ML platform herein automatically discovers a best ML algorithm in a short amount of time (typically minutes) for a plethora of existing and future timeseries forecasting use-cases and avoids the expensive alternative of hiring many experienced data scientists.

In an embodiment, a computer hosts and operates an ML pipeline that automatically measures a temporal statistic of a timeseries. Based on the temporal statistic of the timeseries, a most accurate ML algorithm is selected from many available ML algorithms. Based on the temporal statistic of the timeseries, hyperparameters of the most accurate ML algorithm are tuned. The result from the ML pipeline is a rigorously trained ML model that is validated to have increased accuracy for multiple prediction horizons.

Efficiency is achieved by asymmetry of investment of computer resources in the ML algorithms as decided based on temporal statistics. For a given timeseries, the least promising ML algorithms receive very few computer resources, which provides more computer resources for intensively tuning and training the most promising ML algorithm(s). Thus compared to other approaches, this ML pipeline will: a) produce a more accurate ML model for a given amount of computer resources or b) consume fewer computer resources to achieve a given accuracy.

1.0 Example Computer

FIG. 1 is a block diagram that depicts an embodiment of an example computer 100 that applies timeseries preprocessing, model selection, and hyperparameter tuning techniques based on temporal statistics 120 of original timeseries 111 and a single feed-forward pass through a machine learning (ML) pipeline. Computer 100 may be one or more of a rack server such as a blade, a personal computer, a mainframe, a virtual computer, a smartphone, or other computing device.

1.1 Timeseries and Tuples

In an embodiment, computer 100 stores and operates or processes ML library 130 and original timeseries 111 that is a temporally ordered sequence of tuples. Each tuple may correspond to a distinct time in the past. Tuples may be telemetry samples, events, (e.g. database) records, operational (e.g. console) log entries, (e.g. structured query language, SQL) commands, JavaScript object notation (JSON) or extensible markup language (XML) documents, (e.g. internet protocol, IP) network packets, or other data field aggregations such as an array or set of name-value pairs. For example, original timeseries 111 may represent a stock exchange ticker tape, and each tuple may represent a trade or quote for a respective stock. For example, a tuple may contain data fields such as a stock symbol, a timestamp, a quantity, and a price per share.

FIG. 1 is a block diagram that may also be used as a dataflow diagram according to legend 170 that is demonstrative and not actually instantiated, stored, nor used by computer 100. As shown, the time column contains times T1-T4 that occur in the ordering that their numbering and the downward arrow suggest. For example, time T1 occurs first and time T4 occurs last. Arrows that connect components of FIG. 1 represent dataflow. Each dataflow arrow occurs at a respective time according to the style in which the arrow is drawn and as shown in the style column of legend 170.

1.2 Temporal Statistics

For example, a dotted arrow indicates that a dataflow from original timeseries 111 to temporal statistics 120 occurs at time T1. In particular, computer 100 automatically derives temporal statistics 120 by quantitatively analyzing the tuples in original timeseries 111. Temporal statistics 120 may include frequency 121 and seasonality 122 that characterize original timeseries 111 as a whole.

For example, computer 100 may detect that timestamps of adjacent tuples differ by one hour, which may be frequency 121. Seasonality 122 may include measurements such as a period and an amplitude. For example, seasonality may represent a sine wave.

Temporal statistics 120 may include multiple distinct seasonalities. For example, tuples may contain fields such as color and temperature that respectively fluctuate according to respective seasonalities. A seasonality may be based on multiple fields such as a correlation between two fields.

Temporal statistics 120 may or may not include a degree of differencing as discussed later herein and/or heteroskedasticity that is a kind of volatility based on measuring fluctuating variance (e.g. of a tuple field). Temporal statistics 120 may or may not include any measurement based on tuple field(s) that is used for achieving stationarity such as discussed later herein. Temporal statistics 120 may or may not include any population statistic based on many or all tuples of original timeseries 111 such as a mean, mode, maximum, entropy, or variance.

In an embodiment, times T1-T4 may represent stages in an ML pipeline that computer 100 implements and operates. Computer 100 may retain data produced by a previous stage for use by subsequent stage(s). For example as shown by multiple arrows of distinct styles, temporal statistics 120 is subsequently and repeatedly used at each of times T2-T4 for respective purposes. In other words and unlike other approaches, much or all of the ML pipeline may be sensitive to temporal statistics 120 and thus optimized in special ways for particular original timeseries 111.

1.3 Many Available Ml Algorithms

At a same time, same data may flow to a multiple distinct components. For example at time T2, temporal statistics 120 are used for processing ML library 130 and also used for generating adjusted timeseries 112, which are two separate purposes. Whether or not those two purposes are concurrently handled and/or are handled in a same or separate pipeline stages depends on the embodiment. In other words, time T2 is a logical phase and not necessarily a single physical time.

ML library 130 contains implementations of multiple ML algorithms 131-133 that could process a same timeseries. For example, ML library 130 may be one or more code libraries such as scikit-learn or TensorFlow that may be implemented in same or different programing languages such as Python or Java. ML library 130 is a logical collection and not necessarily a consolidated and curated code library. For example, any or all of ML algorithms 131-133 may have independent implementations that do or do not share implementation modules. In other words, ML algorithms 131-133 may or may not share a codebase or have partially overlapping codebases.

ML algorithms 131-133 have a same inferential functionality that entails prediction such as forecasting and extrapolation. In other words, ML algorithms 131-133 are more or less interchangeable such that a software application need not be concerned as to which one of ML algorithms 131-133 is chosen to provide forecasting. However, ML algorithms 131-133 may have diverse architectures.

For example, ML algorithm 131 may be one kind of artificial neural network such as a recurrent neural network. Likewise, ML algorithm 132 may be a different kind of neural network such as a deep neural network or an entirely unrelated architecture such as autoregressive integrated moving average (ARIMA). Thus, ML algorithms 131-133 are likely to provide somewhat dissimilar forecasting accuracies. For example, ML algorithm 131 may be the most accurate for one timeseries, but ML algorithm 132 may be the most accurate for a different timeseries.

1.4 Timeseries Transformation

At a same time, different data may flow to a same component. For example at time T2, temporal statistics 120 and original timeseries 111 are both used to generate adjusted timeseries 112. For example as discussed later herein, original timeseries 111 may be preprocessed by removing seasonality 122 for smoothing to generate adjusted timeseries 112 that is similar to original timeseries 111 but lacking some periodic fluctuation. In other words, based on temporal statistics 120, adjusted timeseries 112 has none or fewer temporal dependencies than original timeseries 111.

In an embodiment, adjusted timeseries 112 is materialized as a whole timeseries. In an embodiment, adjusted timeseries 112 is instead materialized in a just-in-time way such as per tuple or per batch of tuples such as a season, a period, or a cross validation fold. Thus, adjusted timeseries 112 may be a logical timeseries that is almost entirely unmaterialized.

In an embodiment, adjusted timeseries 112 is unmaterialized and compensation for temporal dependencies such as seasonality is instead delegated to some or all of the ML algorithms. For example, frequency 121, seasonality 122, and/or others of temporal statistics 120 may be directly provided as hyperparameter(s) to an ML algorithm. In other words, a timeseries preprocessor of computer 100 may measure temporal statistics 120, which may subsequently be used to configure hyperparameters of ML algorithms and/or to generate adjusted timeseries 112.

1.5 Seasonality(S)

In an example, seasonality 122 may represent a weekly cycle such that weekends are different from workdays or a daily cycle such that nighttime is different from daytime. Seasonality 122 may confuse an ML algorithm that may wrongly predict that a Saturday will be busy because Friday was busy. For example tuples in original timeseries 111 may have an epochal milliseconds timestamp field and a time zone field that a timeseries preprocessor of computer 100 may use to derive a synthetic field such as a day of week field.

Each tuple in timeseries 111 has a respective associated (e.g. distinct) time that is either: a) expressly recorded in one or a combination of fields or b) implied by frequency 121 (or its inverse that is a period) that may be calculated as discussed below or directly obtained from metadata such as contained elsewhere (i.e. not in the tuple) in original timeseries 111. For example, original timeseries 111 has a demonstrative and implied timeline. When respective times of tuples are correlated with a value or statistic of a field, time typically is the independent variable such as for a graphical plot.

For weekly seasonality, the synthetic field may be inserted into each tuple of adjusted timeseries 112 that otherwise may be more or less a copy of original timeseries 111. In other words, a tuple in adjusted timeseries 112 may contain more fields than a corresponding tuple in original timeseries 111. Likewise, the adjusted tuple and the corresponding original tuple may have a same field, but the preprocessor may cause an adjustment to the value of the field such that the adjusted tuple and the corresponding original tuple have somewhat different respective values for the same field.

1.6 Proxy Ml Models

At time T3, preliminary selection of ML algorithms occurs. For example based on temporal statistics 120, computer 100 may decide that ML algorithm 133 would have low accuracy for original timeseries 111 and thus is unsuitable and should be excluded from further processing by the ML pipeline. For example, frequency 121 may be too high or too low for ML algorithm 133 to accurately perform.

At time T3, ML algorithms 131-132 are selected based on temporal statistics 120 and instantiated as respective ML models 151-152. Each of proxy models 150 is configured with respective default hyperparameters values that are adequate for general use with a wide variety of timeseries. In other words, configuration of most or all hyperparameters of proxy models 150 does not depend on temporal statistics 120. However in an embodiment, none, some, or all of proxy models 150 may have one or a few hyperparameters that are configured based on temporal statistics 120. Each of proxy models 150 may have respective different counts and kinds of hyperparameters.

1.7 Validation and Fitness Score

At time T3, proxy models 150 are trained and validated based on temporal statistics 120 and adjusted timeseries 112 as discussed later herein. Validation provides a respective fitness score that measures the respective accuracy of each of proxy models 150 for adjusted timeseries 112. Final selection of one or a few ML algorithms is based on detecting which have the highest fitness scores.

For example if proxy model 151 has the highest fitness score, then ML algorithm 131 is selected for further processing by the ML pipeline. If only one ML algorithm is desired for further processing, then ML algorithm 132 is excluded from further processing by the ML pipeline.

1.8 Hyperparameter Optimization

At time T4, best model 160, which is instantiated for ML algorithm 131, is trained, validated, and tuned based on temporal statistics 120 and adjusted timeseries 112 as discussed later herein, after which best model 160 may be embedded in a software application such as in a production environment. Tuning may optimize hyperparameters and/or perform feature selection. For example, feature selection may detect fields in adjusted timeseries 112 that are irrelevant to the accuracy of best model 160. Irrelevant fields are removed or ignored such that best model 160 is configured to accept a feature vector as input that excludes irrelevant fields.

Hyperparameter optimization may entail gradient descent. Tuning generally may be iterative and exploratory such that best model 160 is repeatedly reconfigured, retrained, and revalidated to discover a hyperparameter configuration and/or feature selection that provides a highest accuracy for best model 160 as discussed later herein. Training of best model 160 is typically supervised.

1.9 Flexibility Based on Temporal Statistics

As explained earlier herein, temporal statistics 120 may be directly or indirectly used by various pipeline stages in various ways. Indirect usage of temporal statistics 120 entails: a) usage of data produced based on temporal statistics 120 or b) usage of components selected or configured based on temporal statistics 120. Tuple fields within adjusted timeseries 112 may be based on temporal statistics 120. Metadata within adjusted timeseries 112, although not within tuples, may be based on temporal statistics 120.

Any ML pipeline stage may inspect temporal statistics 120 and accordingly adjust behavior. Thus, temporal statistics 120 may have extensive influence over much of the ML pipeline thereby providing increased flexibility within the ML pipeline and increased accuracy of best model 160. In other words, the performance of both the ML pipeline and best model 160 are improved by temporal statistics 120.

2.0 Example ML Pipline Process

FIG. 2 is a flow diagram that depicts an example process that computer 100 may perform to apply timeseries preprocessing, model selection, and hyperparameter tuning techniques based on temporal statistics 120 of original timeseries 111 and a single feed-forward pass through a machine learning (ML) pipeline. FIG. 2 is discussed with reference to FIG. 1.

The shown steps have varied specificity for demonstration. For example, some shown general steps are presented in more detail in subsequent FIGS. Some shown specific steps are not implemented in some embodiments and are presented as examples for perspective such as to clarify an adjacent step.

In an embodiment, the shown steps of FIG. 1 may be stages in an ML pipeline. In some cases, multiple steps may concurrently occur and/or be combined in a same ML pipeline stage. Unlike other approaches, the ML pipeline operates in a single feed-forward pass. That is, although some steps may be repeated for each of proxy models 150 or for each fold of a cross validation or for each iteration in a gradient descent, in any case, each stage of the pipeline operates only once in the single pass.

Thus unlike other approaches that may backtrack for rework to recover from suboptimal speculative/exploratory decisions, this ML pipeline makes committed decisions that monotonically narrow and improve the accuracy of work in progress to maximize the efficiency of the ML pipeline. Thus, the ML pipeline operates somewhat as an automatic funnel that begins with superficial consideration of all of the unconfigured ML algorithms in ML library 130, then cursorily trains some ML algorithms as proxy models 150, and finally settles on one or a few best model(s) 160 for hyperparameter tuning and rigorous training.

From the end of the funnel is emitted a production-ready best model 160 having a highest accuracy. Efficiency is achieved by asymmetry of investment of computer resources (e.g. time and/or electricity) in the ML algorithms as decided based on temporal statistics 120. For a given original timeseries 111, the least promising ML algorithms receive very few computer resources, which provides more computer resources for intensively tuning and training the most promising ML algorithm(s). Thus compared to other approaches, this ML pipeline will: a) produce a more accurate ML model for a given amount of computer resources or b) consume fewer computer resources to achieve a given accuracy.

2.1 Timeseries Preprocessing

Step 201 automatically measures temporal statistics 120 of original timeseries 111. Some, most, or all of temporal statistics 120 may be dedicated to detecting non-stationarity and/or achieving stationarity of tuple field(s) in a timeseries. A timeseries of tuples is a special kind of population of tuples because statistical distributions of tuple field values may be time dependent. In other words, a timeseries may have temporal patterns such as periodic cycles that may confuse a predictive ML model because extrapolation is not straightforward.

For example, a perfect sine wave has no trend, but analysis of a limited time window of the sine wave may reveal a false trend that will frustrate extrapolation when the time window slides to include a peak or an inflection point. Imposing stationarity based on temporal statistics 120 removes such false trends. For example, a year-on-year sales comparison may reveal a true trend that comparing a current month to the immediately previous month cannot. Thus, step 201 makes measurements such as frequency 121 and seasonality 122.

Based on temporal statistics 120, step 202 measures a joint distribution of a tuples field. Here, a joint distribution means a temporal distribution such as based on comparing values of a field in different periods or seasons such as for a year-on-year comparison. Step 202 may measure a joint distribution based on any two of: a first expected value, a second expected value, a first variance, a second variance, a first moment of at least third order, and a second moment of at least third order.

Based on a unit root, step 203 calculates a count of differencing operations needed to achieve data stationarity, also referred to herein as a degree of differencing. Differencing entails measuring a delta between to values of a same field in temporally adjacent tuples. When values of a field across tuples form a straight line without oscillation, then differencing the field provides a flat line because all of the differences of adjacent values are identical.

In some cases, differencing once does not achieve a flat line. For example, multiple seasonalities of different frequencies for a same field may combine into an interference wave that is complicated. Thus, differencing may need repeating. For example, a first order differencing may be followed by a second order differencing. Step 203 may iteratively difference additional orders until a termination criterion is satisfied, at which point a count of differencing operations has occurred. A unit root test is a statistical test that step 203 uses to detect when to cease iterative differencing.

2.2 ML Model Development

Based on temporal statistics 120, step 205 automatically selects a length of a subsequence of adjusted timeseries 112 for training. For example, step 205 may select a count or a minimum count of periods or seasons. For example, cross validation may entail multiple trainings such as with separate folds, each of which may be a distinct or partially overlapping subsequence of a same length or of different lengths exceeding a same minimum length as discussed later herein. In an embodiment, the same length or minimum length calculated by step 205 is used for both proxy models 150 and best model 160 in respective ML pipeline stages.

Based on temporal statistics 120, step 206 validates proxy models 150 such as with or without cross validation or, as explained later herein, with walk forward cross validation. In any case, step 206 measures a fitness score for each of proxy models 150 that can be used to rank proxy models 150 for a particular timeseries.

Based on temporal statistics 120 and highest validation fitness score(s), step 207 selects the most accurate ML algorithm(s), which will be used for best model 160 or a best few models. Only ML algorithm(s) selected by step 207 will be processed by subsequent steps of FIG. 2. Subsequent stages of the ML pipeline are dedicated to those selected ML algorithm(s).

Based on the most accurate ML algorithm, step 208 instantiates best model 160. In an embodiment, if ML algorithm 131 is selected as the most accurate, then step 208 initially configures best model 160 with the same hyperparameters values as proxy model 151. In an embodiment, models 151 and 160 may initially have different values for a few hyperparameters but same values for most hyperparameters.

For example, best model 160 may initially have more neural layers than proxy model 151. In any case, the initial hyperparameters configuration of best model 160 will evolve by tuning as discussed later herein. In other words and after tuning, best model 160 should be more accurate than all of proxy models 150.

Based on temporal statistics 120, step 209 identifies a respective values subrange for some hyperparameter(s) of best model 160 as a preface to hyperparameters tuning. For example if seasonality 122 is weekly, then step 209 may limit a seasonality hyperparameter to a range of 5-10 days or exactly seven days.

Based on temporal statistics 120, step 210A tunes hyperparameters of best model 160 such as by gradient descent that entails iteratively reconfiguring hyperparameters, retraining, and revalidating to measure fitness scores that provide a gradient. Thus, step 210A may entail repetitions of step 210B that, based on temporal statistics 120, validates best model 160. As discussed later herein, temporal statistics 120 may be used to adjust validation in some ways. Thus, steps 210A-B may depend on temporal statistics 120. By finishing steps 210A-B, best model 160 is fully trained and ready for production deployment.

3.0 Example Seasonality Processing

FIG. 3 is a flow diagram that depicts an example process that computer 100 may perform to analyze seasonalities in a machine learning (ML) pipeline. FIG. 3 is discussed with reference to FIGS. 1-2.

3.1 Timeseries Preprocessing for Seasonalities

Preprocessor steps 301-306 may be part of preprocessor steps 201-203 of FIG. 2 that may be performed by a timeseries preprocessor of computer 100 to detect and analyze seasonalities. Validation step 307 is not performed by the timeseries preprocessor and instead occurs during validation step 206 and/or 210B of FIG. 2 to facilitate detecting which seasonality most affects model accuracy, which may or may not be the dominant seasonality of preprocessor steps 304-306 as explained later herein.

Step 301 removes linear trends (e.g. slope) by, for example, fitting a second-degree polynomial regression with an Ordinary Least Squares estimator. The output of step 301 is a respective remainder timeseries component for each of some tuple fields.

Step 302 differences each remainder timeseries component to remove cyclicity and general trends. Differencing is explained earlier herein for preprocessor step 203 of FIG. 2 that may be part of step 302. The output of step 302 is a differenced timeseries.

Step 303 applies an AutoCorrelation Function (ACF) over the differenced timeseries to calculate a respective correlation coefficient at specific lagged points in the timeseries for multiple seasonalities of a tuple field. These seasonalities are a mix of significant and insignificant seasonalities.

Step 304 sorts the mix of seasonalities in descending order by value of correlation coefficient. The seasonality with the largest correlation coefficient is the dominant seasonality. Other approaches merely use the dominant seasonality, which does not depend on which ML model will consume adjusted timeseries 112. However, subsequent steps 305-307 may find another seasonality that has more impact on ML model accuracy. Step 307 depends on which ML model is involved as explained below.

Distinguishing significant seasonalities from insignificant seasonalities entails two filtration steps 305-306. Based on correlation coefficient, step 305 selects the k (e.g. six) largest seasonalities for further evaluation, which includes the dominant seasonality.

Step 306 discards any of the k largest seasonalities whose correlation coefficient does not exceed a critical value threshold of autocorrelation (e.g. 5%) at lagged values. Any seasonalities not discarded by step 306 includes the dominant seasonality.

3.2 Ml Model Development Based on Seasonalities

Seasonality analysis by the timeseries preprocessor finishes when step 306 provides a few (e.g. three) significant seasonalities. However, which of those seasonalities has more impact on ML model accuracy depends on which ML algorithm and which timeseries is used. For example with a smaller seasonality and a larger seasonality, ML algorithm 131 may be more accurate based on the smaller seasonality and ML algorithm 132 may instead be more accurate based on the larger seasonality. In another example, two timeseries have a same two seasonalities, and which seasonality provides the most accuracy for a same ML algorithm depends on which timeseries is used.

Step 307 uses best model 160 to measure a respective validation fitness score for each of multiple seasonalities such as the few seasonalities retained by step 306. Thus, step 307 may detect which seasonality provides a highest fitness score which, counterintuitively, might not be the dominant seasonality. When leaving the ML pipeline, best model 160 is already configured, trained, and ready for production deployment based on the best seasonality selected by step 307.

4.0 Novel Walk Forward Cross Validation

Figure 4:
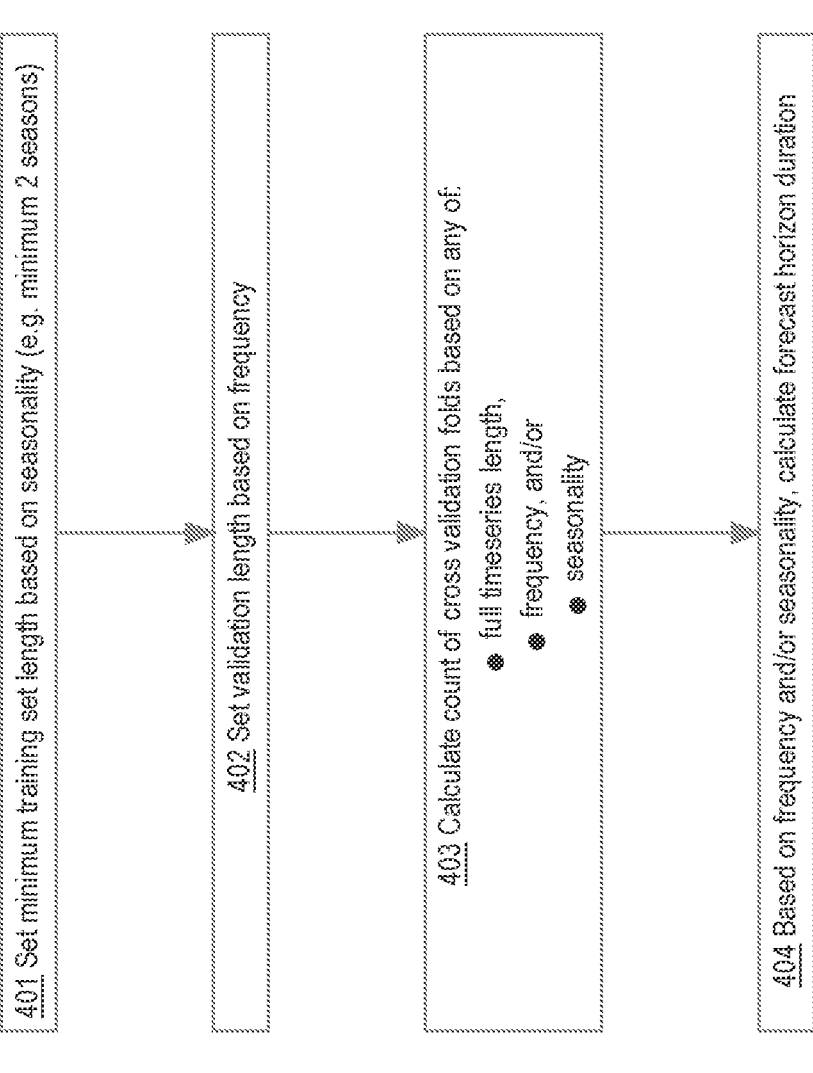
FIG. 4 is a flow diagram that depicts an example computer process, based on temporal statistics, as a preface to walk forward cross validation.

FIG. 4 is a flow diagram that depicts an example process that computer 100 may perform, based on temporal statistics 120, as a preface to walk forward cross validation. FIG. 4 is discussed with reference to FIGS. 1-3.

Step 401 calculates a minimum training set length based on seasonality 122 (e.g. minimum 2 seasons). Cross validation entails a respective fold for each of multiple independent trainings. Each fold may contain a subset of the tuples of the timeseries, such as a (e.g. non- or partially overlapping) subsequence of the timeseries. Step 401 calculates a minimum count of periods, seasons, or tuples that each fold should contain.

Step 401 calculates a minimum because FIG. 4 performs walk forward cross validation. Ordinary cross validation has folds that: a) all have a same size and b) do not overlap or else accidentally share some arbitrary tuples based on random sampling. Walk forward cross validation is specialized for timeseries data such that: a) each fold is a super-sequence of the previous fold such that each fold: b) has a distinct size and c) contains all of the tuples of the previous fold and an additional subsequence. Thus: a) each fold contains the union of all previous folds, and b) step 401 calculates a minimum subsequence length, which is the size of the first (i.e. smallest) fold, which may or may not be the same length as the additional subsequence of (c) above.

Step 402 calculates a validation length based on frequency 121. In other words, step 402 calculates the size of the validation fold, which may or may not be: a) a holdout fold that is disjoint (i.e. no overlap) from the training folds and/or b) is smaller than the smallest training fold and/or smaller than a season.

Step 403 calculates a count of cross validation folds based on any of: the full length of timeseries 111, frequency 121, and/or seasonality 122. Thus unlike other approaches, two timeseries of a same length may need different counts of folds due to different values for temporal statistics 120 as due to different raw values within each timeseries.

Based on frequency 111 and/or seasonality 112, step 404 automatically calculates a forecast horizon duration, which is novel. Other approaches expect the user to declare in advance exactly how far into the future should be an ML model's prediction. Instead, step 404 ensures that the ML model can be configured and trained to be accurate at several forecast horizons.

For example, the user may expect the ML model to predict an hourly sales total that is six hours in the future. Step 404 can instead calculate a forecast horizon (e.g. 7 hours) that can be used to train the ML model to be accurate at forecast horizons of 5, 6, 7, and 8 hours. Thus, the deployed ML model is somewhat future proofed if needs of an application change.

For example: a) the forecast horizon may be a hyperparameter that is tuned by step 210A of FIG. 2, and b) validation step 210B of FIGS. 2 and/or 307 of FIG. 3 may be repeated to ensure accuracy at respective slightly different forecast horizons. Thus, step 404 may entail steps 210A-B and/or 307.

5.0 Examplary ML Pipeline Embodiment

Here is an exemplary embodiment of a timeseries ML pipeline that may be an implementation of embodiments presented earlier herein. This exemplary embodiment demonstrates characteristics and design choices that are not necessarily requirements or expectations of embodiments presented earlier herein.

Statistically significant seasonal periods are discovered and selected as discussed earlier herein. The dominant seasonal period (i.e. exhibiting the largest strength) is provided to the proxy models evaluation phase such as for configuring some hyperparameters. This facilitates fairly evaluating proxy models that may or may not explicitly consider seasonal fluctuations of the data during forecasting. A same model-agnostic fitness metric is used for evaluating the proxy models.

Distance to stationarity is automatically detected as discussed earlier herein. A stationary timeseries is one where the joint distribution of any moments of any degree (e.g., expected values, variances, third order and higher moments) within the process is not dependent on time. Most forecasting algorithms assume that a timeseries is stationary, since statistical tests of autocovariance and autocorrelations rely on the assumption of stationarity. However, most timeseries have empirical features that are inconsistent with the assumptions of stationarity (e.g., most practical timeseries have trends, seasonal variations, etc. that make these timeseries non-stationary).

Differencing is used in timeseries analysis here to transform a non-stationary timeseries that needs one or more differencing operations to become stationary to be suitable for difference-stationary ML models. Differencing is performed by subtracting the previous observation (i.e. tuple field value) from the current observation. The timeseries preprocessor determines the degree of differencing parameter (i.e. count of differencing operations required) using a combination of unit-root and stationarity tests, such as the Kwiatkowski-Phillips-Schmidt-Shin (KPSS) test and the Augmented Dickey-Fuller (ADF) test. The degree of differencing is configured into or otherwise provided to the proxy models so that the proxy models accurately indicate potential tuned performance of their respective ML algorithms.

The benefits of determining the differencing via statistical tests extend into downstream ML pipeline stages. Validating differencing order during cross validation can lead to model overfitting, since differencing transforms data scale and alters the scale-dependent scoring metric used to compare ML algorithms. Optimizing the differencing order narrows the search space of hyperparameters tuning, further improving this exemplary ML pipeline's efficiency.

ML model fitness is measured with symmetric mean absolute percentage error (SMAPE) for each timeseries periodicity. The ML algorithm selection stage identifies a best ML algorithm with a proxy model fitness score that is very close to a fitness score from exhaustive tuning. So effective are the proxy models that experiments have shown a very similar best fitness score regardless of whether a best one or a best five ML models are promoted from proxy evaluation to full tuning.

An adaptive cross validation strategy is used to develop the forecasting ML model. This exemplary ML pipeline uses out-of-sample error estimates to score each ML model (i.e., predictions on future values that are outside of the training set), such as with a holdout validation fold, so it is important that the cross validation sets also accurately capture how the ML model generalizes to predictions of future timesteps. Timeseries violate the basic statistical assumptions of the canonical K-fold cross validation because the training set consists only of observations that occurred prior to the observation that forms the test set. Hence, this exemplary ML pipeline implements a specific procedure to create cross validation folds for timeseries data.

Moreover, the validation lengths during cross validation have significant influence over the hyperparameter selection for each ML model and the quality of their forecasts. As a result, the cross validation strategy affects the top choice of ML model during ML algorithm selection and ML pipeline configuration. Each ML algorithm differs in its strength in forecasting at various lengths of future forecast periods. This exemplary ML pipeline operates without the knowledge of forecast horizons desired by the forecaster application or user. Cross validation sets are used that are robust over multiple forecast periods.

This exemplary ML pipeline automatically utilizes an adaptive Walk-Forward Cross validation (WFCV). Based on the length and frequency of the timeseries, a count of cross validation folds and a length of the validation set are chosen. The choice of these parameters produces accurate forecasts over multiple lead times, irrespective of the length of the future horizon forecast by the user. The adaptive WFCV algorithm entails the following steps:

1. Determine frequency of timeseries data and prevalent seasonal periodicity (SP)
2. Set minimum training set length (train_len) requirement based on SP (e.g., minimum 2 seasons)
3. Set validation set length (valid_len) requirement based on frequency of timeseries (e.g., hourly data—48 hours; weekly data—6 weeks; monthly data—6 months, yearly data—2 years). These requirements were empirically proven across commonly used validation lengths.
4. Based on the full timeseries data length compute a count of cross validation folds to be used in WFCV.

The above adaptive WFCV algorithm additionally optimizes for ML pipeline efficiency by truncating the timeseries data to the maximum required latest timestamp samples, when subjected to a maximum count of cross validation folds. For instance, if the maximum count of cross validation folds is set to five, then only the necessary count of latest time samples (i.e. tuples) are kept to train ML models, since they are likely to be the most representative samples for forecasting future values. SMAPE error and SMAPE variance of this exemplary ML pipeline are empirically proven to be improved (i.e. decreased) by the adaptive variant of the WFCV versus without WFCV.

Hardware Over View

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
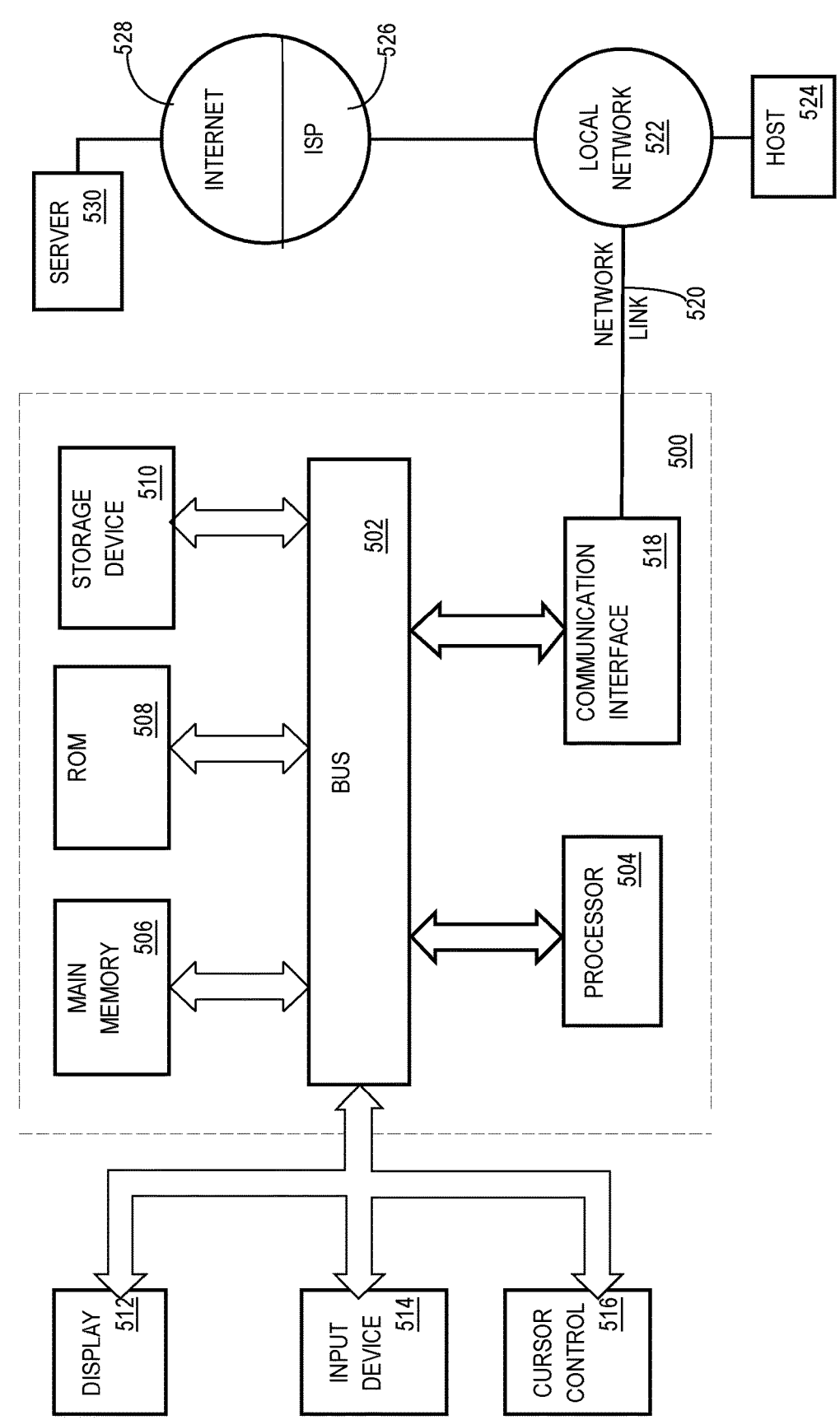
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

Figure 6:
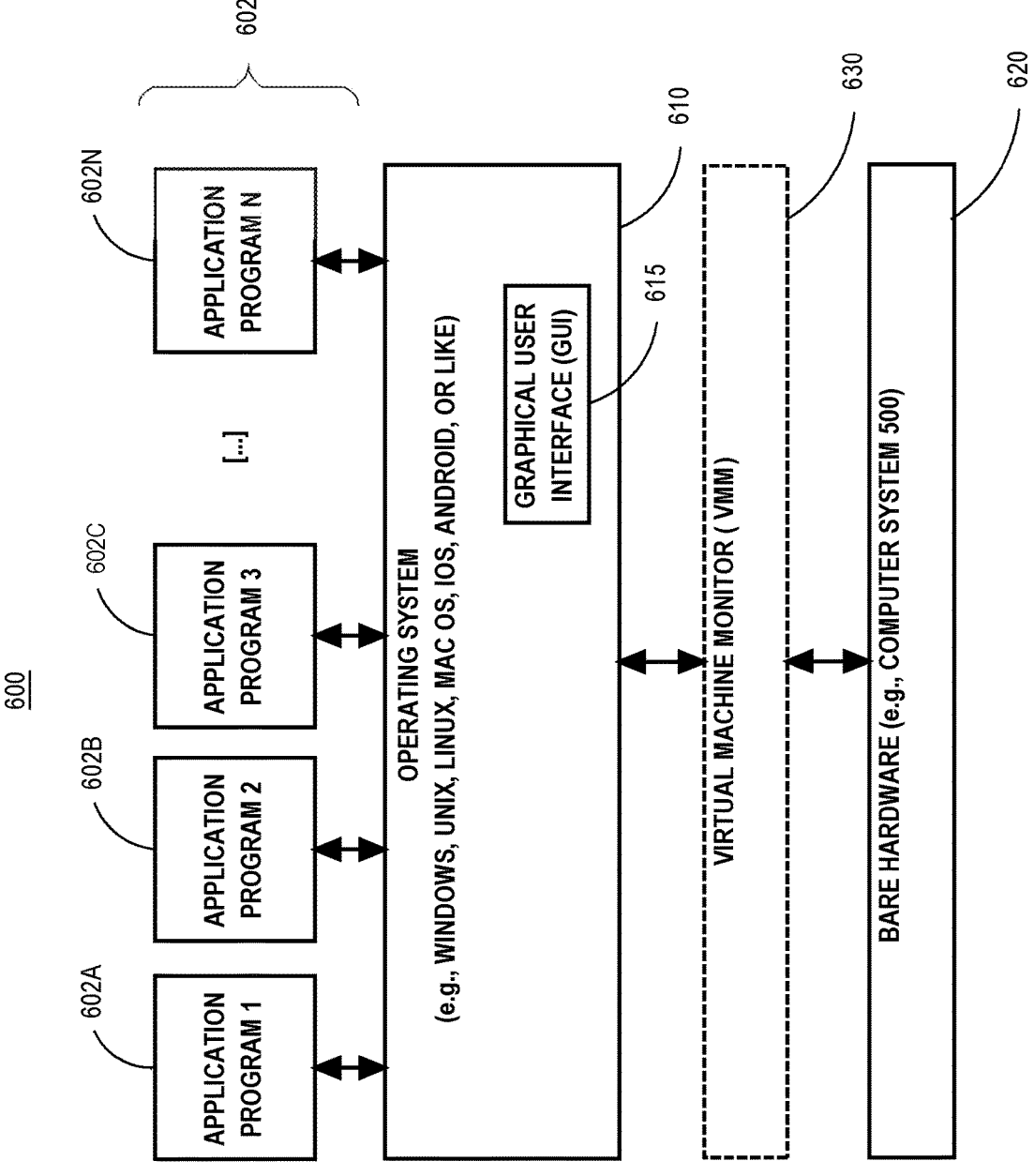
FIG. 6 is a block diagram that illustrates a basic software system that may be employed for controlling the operation of a computing system.

The received code may be executed by processor 504 as it is received, and/or stored in storage device 510, or other non-volatile storage for later execution.
Software Overview FIG. 6 is a block diagram of a basic software system 600 that may be employed for controlling the operation of computing system 500. Software system 600 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 600 is provided for directing the operation of computing system 500. Software system 600, which may be stored in system memory (RAM) 506 and on fixed storage (e.g., hard disk or flash memory) 510, includes a kernel or operating system (OS) 610.

The OS 610 manages low-level aspects of computer operation, including managing execution of processes, memory allocation, file input and output (I/O), and device I/O. One or more application programs, represented as 602A, 602B, 602C . . . 602N, may be "loaded" (e.g., transferred from fixed storage 510 into memory 506) for execution by the system 600. The applications or other software intended for use on computer system 500 may also be stored as a set of downloadable computer-executable instructions, for example, for downloading and installation from an Internet location (e.g., a Web server, an app store, or other online service).

Software system 600 includes a graphical user interface (GUI) 615, for receiving user commands and data in a graphical (e.g., "point-and-click" or "touch gesture") fashion. These inputs, in turn, may be acted upon by the system 600 in accordance with instructions from operating system 610 and/or application(s) 602. The GUI 615 also serves to display the results of operation from the OS 610 and application(s) 602, whereupon the user may supply additional inputs or terminate the session (e.g., log off).

OS 610 can execute directly on the bare hardware 620 (e.g., processor(s) 504) of computer system 500. Alternatively, a hypervisor or virtual machine monitor (VMM) 630 may be interposed between the bare hardware 620 and the OS 610. In this configuration, VMM 630 acts as a software "cushion" or virtualization layer between the OS 610 and the bare hardware 620 of the computer system 500.

VMM 630 instantiates and runs one or more virtual machine instances ("guest machines"). Each guest machine comprises a "guest" operating system, such as OS 610, and one or more applications, such as application(s) 602, designed to execute on the guest operating system. The VMM 630 presents the guest operating systems with a virtual operating platform and manages the execution of the guest operating systems.

In some instances, the VMM 630 may allow a guest operating system to run as if it is running on the bare hardware 620 of computer system 500 directly. In these instances, the same version of the guest operating system configured to execute on the bare hardware 620 directly may also execute on VMM 630 without modification or reconfiguration. In other words, VMM 630 may provide full hardware and CPU virtualization to a guest operating system in some instances.

In other instances, a guest operating system may be specially designed or configured to execute on VMM 630 for efficiency. In these instances, the guest operating system is "aware" that it executes on a virtual machine monitor. In other words, VMM 630 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.
Cloud Computing The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Machine Learning Models

A machine learning model is trained using a particular machine learning algorithm. Once trained, input is applied to the machine learning model to make a prediction, which may also be referred to herein as a predicated output or output. Attributes of the input may be referred to as features and the values of the features may be referred to herein as feature values.

A machine learning model includes a model data representation or model artifact. A model artifact comprises parameters values, which may be referred to herein as theta values, and which are applied by a machine learning algorithm to the input to generate a predicted output. Training a machine learning model entails determining the theta values of the model artifact. The structure and organization of the theta values depends on the machine learning algorithm.

In supervised training, training data is used by a supervised training algorithm to train a machine learning model. The training data includes input and a "known" output. In an embodiment, the supervised training algorithm is an iterative procedure. In each iteration, the machine learning algorithm applies the model artifact and the input to generate a predicated output. An error or variance between the predicated output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algorithm is gradient descent. The iterations may be repeated until a desired accuracy is achieved or some other criteria is met.

In a software implementation, when a machine learning model is referred to as receiving an input, being executed, and/or generating an output or predication, a computer system process executing a machine learning algorithm applies the model artifact against the input to generate a predicted output. A computer system process executes a machine learning algorithm by executing software configured to cause execution of the algorithm. When a machine learning model is referred to as performing an action, a computer system process executes a machine learning algorithm by executing software configured to cause performance of the action.

Classes of problems that machine learning (ML) excels at include clustering, classification, regression, anomaly detection, prediction, and dimensionality reduction (i.e. simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e. configurable) implementations of best of breed machine learning algorithms may be found in open source libraries such as Google's TensorFlow for Python and C++ or Georgia Institute of Technology's MLPack for C++. Shogun is an open source C++ ML library with adapters for several programing languages including C#, Ruby, Lua, Java, MatLab, R, and Python.

Artificial Neural Networks

An artificial neural network (ANN) is a machine learning model that at a high level models a system of neurons interconnected by directed edges. An overview of neural networks is described within the context of a layered feedforward neural network. Other types of neural networks share characteristics of neural networks described below.

In a layered feed forward network, such as a multilayer perceptron (MLP), each layer comprises a group of neurons. A layered neural network comprises an input layer, an output layer, and one or more intermediate layers referred to hidden layers.

Neurons in the input layer and output layer are referred to as input neurons and output neurons, respectively. A neuron in a hidden layer or output layer may be referred to herein as an activation neuron. An activation neuron is associated with an activation function. The input layer does not contain any activation neuron.

From each neuron in the input layer and a hidden layer, there may be one or more directed edges to an activation neuron in the subsequent hidden layer or output layer. Each edge is associated with a weight. An edge from a neuron to an activation neuron represents input from the neuron to the activation neuron, as adjusted by the weight.

For a given input to a neural network, each neuron in the neural network has an activation value. For an input neuron, the activation value is simply an input value for the input. For an activation neuron, the activation value is the output of the respective activation function of the activation neuron.

Each edge from a particular neuron to an activation neuron represents that the activation value of the particular neuron is an input to the activation neuron, that is, an input to the activation function of the activation neuron, as adjusted by the weight of the edge. Thus, an activation neuron in the subsequent layer represents that the particular neuron's activation value is an input to the activation neuron's activation function, as adjusted by the weight of the edge. An activation neuron can have multiple edges directed to the activation neuron, each edge representing that the activation value from the originating neuron, as adjusted by the weight of the edge, is an input to the activation function of the activation neuron.

Each activation neuron is associated with a bias. To generate the activation value of an activation neuron, the activation function of the neuron is applied to the weighted activation values and the bias.

Illustrative Data Structures for Neural Network

The artifact of a neural network may comprise matrices of weights and biases. Training a neural network may iteratively adjust the matrices of weights and biases.

For a layered feedforward network, as well as other types of neural networks, the artifact may comprise one or more matrices of edges W. A matrix W represents edges from a layer L-1 to a layer L. Given the number of neurons in layer L-1 and L is N[L-1] and N[L], respectively, the dimensions of matrix W is N[L-1] columns and N[L] rows.

Biases for a particular layer L may also be stored in matrix B having one column with N[L] rows.

The matrices W and B may be stored as a vector or an array in RAM memory, or comma separated set of values in memory. When an artifact is persisted in persistent storage, the matrices W and B may be stored as comma separated values, in compressed and/serialized form, or other suitable persistent form.

A particular input applied to a neural network comprises a value for each input neuron. The particular input may be stored as vector. Training data comprises multiple inputs, each being referred to as sample in a set of samples. Each sample includes a value for each input neuron. A sample may be stored as a vector of input values, while multiple samples may be stored as a matrix, each row in the matrix being a sample.

When an input is applied to a neural network, activation values are generated for the hidden layers and output layer. For each layer, the activation values for may be stored in one column of a matrix A having a row for every neuron in the layer. In a vectorized approach for training, activation values may be stored in a matrix, having a column for every sample in the training data.

Training a neural network requires storing and processing additional matrices. Optimization algorithms generate matrices of derivative values which are used to adjust matrices of weights W and biases B. Generating derivative values may use and require storing matrices of intermediate values generated when computing activation values for each layer.

The number of neurons and/or edges determines the size of matrices needed to implement a neural network. The smaller the number of neurons and edges in a neural network, the smaller matrices and amount of memory needed to store matrices. In addition, a smaller number of neurons and edges reduces the amount of computation needed to apply or train a neural network. Less neurons means less activation values need be computed, and/or less derivative values need be computed during training.

Properties of matrices used to implement a neural network correspond neurons and edges. A cell in a matrix W represents a particular edge from a neuron in layer L-1 to L. An activation neuron represents an activation function for the layer that includes the activation function. An activation neuron in layer L corresponds to a row of weights in a matrix W for the edges between layer L and L-1 and a column of weights in matrix W for edges between layer L and L+1. During execution of a neural network, a neuron also corresponds to one or more activation values stored in matrix A for the layer and generated by an activation function.

An ANN is amenable to vectorization for data parallelism, which may exploit vector hardware such as single instruction multiple data (SIMD), such as with a graphical processing unit (GPU). Matrix partitioning may achieve horizontal scaling such as with symmetric multiprocessing (SMP) such as with a multicore central processing unit (CPU) and or multiple coprocessors such as GPUs. Feed forward computation within an ANN may occur with one step per neural layer. Activation values in one layer are calculated based on weighted propagations of activation values of the previous layer, such that values are calculated for each subsequent layer in sequence, such as with respective iterations of a for loop. Layering imposes sequencing of calculations that is not parallelizable. Thus, network depth (i.e. amount of layers) may cause computational latency. Deep learning entails endowing a multilayer perceptron (MLP) with many layers. Each layer achieves data abstraction, with complicated (i.e. multidimensional as with several inputs) abstractions needing multiple layers that achieve cascaded processing. Reusable matrix based implementations of an ANN and matrix operations for feed forward processing are readily available and parallelizable in neural network libraries such as Google's TensorFlow for Python and C++, OpenNN for C++, and University of Copenhagen's fast artificial neural network (FANN). These libraries also provide model training algorithms such as backpropagation.

Backpropagation

An ANN's output may be more or less correct. For example, an ANN that recognizes letters may mistake an I as an L because those letters have similar features. Correct output may have particular value(s), while actual output may have somewhat different values. The arithmetic or geometric difference between correct and actual outputs may be measured as error according to a loss function, such that zero represents error free (i.e. completely accurate) behavior. For any edge in any layer, the difference between correct and actual outputs is a delta value.

Backpropagation entails distributing the error backward through the layers of the ANN in varying amounts to all of the connection edges within the ANN. Propagation of error causes adjustments to edge weights, which depends on the gradient of the error at each edge. Gradient of an edge is calculated by multiplying the edge's error delta times the activation value of the upstream neuron. When the gradient is negative, the greater the magnitude of error contributed to the network by an edge, the more the edge's weight should be reduced, which is negative reinforcement. When the gradient is positive, then positive reinforcement entails increasing the weight of an edge whose activation reduced the error. An edge weight is adjusted according to a percentage of the edge's gradient. The steeper is the gradient, the bigger is adjustment. Not all edge weights are adjusted by a same amount. As model training continues with additional input samples, the error of the ANN should decline. Training may cease when the error stabilizes (i.e. ceases to reduce) or vanishes beneath a threshold (i.e. approaches zero). Example mathematical formulae and techniques for feedforward multilayer perceptron (MLP), including matrix operations and backpropagation, are taught in related reference "EXACT CALCULATION OF THE HESSIAN MATRIX FOR THE MULTI-LAYER PERCEPTRON," by Christopher M. Bishop.

Model training may be supervised or unsupervised. For supervised training, the desired (i.e. correct) output is already known for each example in a training set. The training set is configured in advance by (e.g. a human expert) assigning a categorization label to each example. For example, the training set for optical character recognition may have blurry photographs of individual letters, and an expert may label each photo in advance according to which letter is shown. Error calculation and backpropagation occurs as explained above.

Autoencoder

Unsupervised model training is more involved because desired outputs need to be discovered during training. Unsupervised training may be easier to adopt because a human expert is not needed to label training examples in advance. Thus, unsupervised training saves human labor. A natural way to achieve unsupervised training is with an autoencoder, which is a kind of ANN. An autoencoder functions as an encoder/decoder (codec) that has two sets of layers. The first set of layers encodes an input example into a condensed code that needs to be learned during model training. The second set of layers decodes the condensed code to regenerate the original input example. Both sets of layers are trained together as one combined ANN. Error is defined as the difference between the original input and the regenerated input as decoded. After sufficient training, the decoder outputs more or less exactly whatever is the original input.

An autoencoder relies on the condensed code as an intermediate format for each input example. It may be counter-intuitive that the intermediate condensed codes do not initially exist and instead emerge only through model training. Unsupervised training may achieve a vocabulary of intermediate encodings based on features and distinctions of unexpected relevance. For example, which examples and which labels are used during supervised training may depend on somewhat unscientific (e.g. anecdotal) or otherwise incomplete understanding of a problem space by a human expert. Whereas, unsupervised training discovers an apt intermediate vocabulary based more or less entirely on statistical tendencies that reliably converge upon optimality with sufficient training due to the internal feedback by regenerated decodings. Techniques for unsupervised training of an autoencoder for anomaly detection based on reconstruction loss is taught in non-patent literature (NPL) "VARIATIONAL AUTOENCODER BASED ANOMALY DETECTION USING RECONSTRUCTION PROBABILITY", Special Lecture on IE. 2015 Dec. 27;2 (1): 1-18 by Jinwon An et al.

Principal Component Analysis

Principal component analysis (PCA) provides dimensionality reduction by leveraging and organizing mathematical correlation techniques such as normalization, covariance, eigenvectors, and eigenvalues. PCA incorporates aspects of feature selection by eliminating redundant features. PCA can be used for prediction. PCA can be used in conjunction with other ML algorithms.

Random Forest

A random forest or random decision forest is an ensemble of learning approaches that construct a collection of randomly generated nodes and decision trees during a training phase. Different decision trees of a forest are constructed to be each randomly restricted to only particular subsets of feature dimensions of the data set, such as with feature bootstrap aggregating (bagging). Therefore, the decision trees gain accuracy as the decision trees grow without being forced to over fit training data as would happen if the decision trees were forced to learn all feature dimensions of the data set. A prediction may be calculated based on a mean (or other integration such as soft max) of the predictions from the different decision trees.

Random forest hyper-parameters may include: number-of-trees-in-the-forest, maximum-number-of-features-considered-for-splitting-a-node, number-of-levels-in-each-decision-tree, minimum-number-of-data-points-on-a-leaf-node, method-for-sampling-data-points, etc.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:

automatically measuring, for a timeseries, a seasonality and a stationarity differencing count;

assigning the stationarity differencing count to a respective differencing hyperparameter of each machine learning (ML) algorithm from a plurality of ML algorithms;

selecting, based on said assigning, a most accurate ML algorithm from the plurality of ML algorithms;

identifying a values subrange of a seasonality hyperparameter of the most accurate ML algorithm;

automatically selecting, based on said stationarity differencing count, a minimum length of a training subsequence of the timeseries;

tuning, based on the values subrange of the seasonality hyperparameter of the most accurate ML algorithm, hyperparameters of said most accurate ML algorithm; and training, with a plurality of subsequences of the timeseries that have at least the minimum length, an ML model that is based on; said tuning and the most accurate ML algorithm;

wherein the method is performed by one or more computers.

2. The method of claim 1 wherein:

the plurality of ML algorithms consists of said most accurate ML algorithm and a plurality of other ML algorithms;

the method does not comprise tuning hyperparameters of at least one ML algorithm of the plurality of other ML algorithms.

3. The method of claim 1 further comprising validating, based on said stationarity differencing count, said most accurate ML algorithm during at least one selected from the group consisting of:

said selecting said most accurate ML algorithm and said tuning said hyperparameters of said most accurate ML algorithm.

4. The method of claim 3 wherein:

said validating said most accurate ML algorithm comprises automatically calculating a forecast horizon duration.

5. The method of claim 3 wherein:

said validating said most accurate ML algorithm comprises measuring, for each seasonality of a plurality of seasonalities, a respective fitness of said most accurate ML algorithm;

said fitnesses of said most accurate ML algorithm consists of:

a) a highest fitness for a particular seasonality of said plurality of seasonalities and b) fitnesses for other seasonalities;

said tuning said hyperparameters of said most accurate ML algorithm is based on said particular seasonality and not said other seasonalities.

6. The method of claim 1 further comprising validating the ML model based on said stationarity and at least one selected from the group consisting of seasonality and frequency.

7. The method of claim 1 further comprising measuring seasonality by at least one selected for the group consisting of:

fitting a second-degree polynomial regression, fitting a polynomial regression with an ordinary least squares estimator, applying an autocorrelation function (ACF) to a differenced timeseries that is based on said timeseries, calculating a coefficient at specific lagged values of a differenced timeseries that is based on said timeseries, calculating a coefficient that represent a strength of a linear relationship between respective values in two seasons of a same seasonality, sorting respective coefficients of a plurality of seasonalities, and identifying a subset of a plurality of seasonalities having respective coefficients that exceed a seasonality threshold.

8. The method of claim 1 further comprising measuring, based on said timeseries, a joint distribution of two selected from the group consisting of: a first expected value, a second expected value, a first variance, a second variance, a first moment of at least third order, and a second moment of at least third order.

9. The method of claim 1 further comprising calculating, based on a unit root test, a count of differencing operations needed for data stationarity.

10. One or more computer-readable non-transitory media storing instructions that, when executed by one or more processors, cause:

automatically measuring, for a timeseries, a seasonality and a stationarity differencing count;

assigning the stationarity differencing count to a respective differencing hyperparameter of each machine learning (ML) algorithm from a plurality of ML algorithms;

selecting, based on said assigning, a most accurate ML algorithm from the plurality of ML algorithms;

identifying a values subrange of a seasonality hyperparameter of the most accurate ML algorithm;

automatically selecting, based on said stationarity differencing count, a minimum length of a training subsequence of the timeseries;

tuning, based on the values subrange of the seasonality hyperparameter of the most accurate ML algorithm, hyperparameters of said most accurate ML algorithm; and training, with a plurality of subsequences of the timeseries that have at least the minimum length, an ML model that is based on; said tuning and the most accurate ML algorithm.

11. The one or more computer-readable non-transitory media of claim 10 wherein:

the plurality of ML algorithms consists of said most accurate ML algorithm and a plurality of other ML algorithms;

the instructions does not cause tuning hyperparameters of at least one ML algorithm of the plurality of other ML algorithms.

12. The one or more computer-readable non-transitory media of claim 10 wherein the instructions further cause validating, based on said stationarity differencing count, said most accurate ML algorithm during at least one selected from the group consisting of:

said selecting said most accurate ML algorithm and said tuning said hyperparameters of said most accurate ML algorithm.

13. The one or more computer-readable non-transitory media of claim 12 wherein;

said validating said most accurate ML algorithm comprises automatically calculating a forecast horizon duration.

14. The one or more computer-readable non-transitory media of claim 12 wherein:

said validating said most accurate ML algorithm comprises measuring, for each seasonality of a plurality of seasonalities, a respective fitness of said most accurate ML algorithm;

said fitnesses of said most accurate ML algorithm consists of:

a) a highest fitness for a particular seasonality of said plurality of seasonalities and b) fitnesses for other seasonalities;

said tuning said hyperparameters of said most accurate ML algorithm is based on said particular seasonality and not said other seasonalities.

15. The one or more computer-readable non-transitory media of claim 10 wherein the instructions further cause validating the ML model based on said stationarity and at least one selected from the group consisting of seasonality and frequency.

16. The one or more computer-readable non-transitory media of claim 10 wherein the instructions further cause measuring seasonality by at least one selected for the group consisting of:

removing linear trends, fitting a second-degree polynomial regression, fitting a polynomial regression with an ordinary least squares estimator, applying an autocorrelation function (ACF) to a differenced timeseries that is based on said timeseries, calculating a coefficient at specific lagged values of a differenced timeseries that is based on said timeseries, calculating a coefficient that represent a strength of a linear relationship between respective values in two seasons of a same seasonality, sorting respective coefficients of a plurality of seasonalities, and identifying a subset of a plurality of seasonalities having respective coefficients that exceed a seasonality threshold.

* * * * *